(12) United States Patent
Teague et al.

(10) Patent No.: US 9,079,373 B2
(45) Date of Patent: Jul. 14, 2015

(54) SYSTEM AND METHOD FOR EMBOSSING/DEBOSSING IMPRESSIONABLE MATERIAL

(75) Inventors: Lowell Teague, Lenexa, KS (US); Dana Poulain, De Soto, KS (US)

(73) Assignee: Preco, Inc., Lenexa, KS (US)

( * ) Notice: Subject to any disclaimer, the term of this patent is extended or adjusted under 35 U.S.C. 154(b) by 857 days.

(21) Appl. No.: 13/253,525

(22) Filed: Oct. 5, 2011

(65) Prior Publication Data

US 2012/0091630 A1  Apr. 19, 2012

Related U.S. Application Data

(60) Provisional application No. 61/394,225, filed on Oct. 18, 2010.

(51) Int. Cl.
*B31F 1/07* (2006.01)
*B23K 26/362* (2014.01)
*B23K 26/36* (2014.01)

(52) U.S. Cl.
CPC ................. *B31F 1/07* (2013.01); *B23K 26/365* (2013.01); *B31F 2201/0702* (2013.01); *B31F 2201/0776* (2013.01)

(58) Field of Classification Search
CPC ............... B31F 1/07; B31F 2201/0702; B31F 2201/0776
See application file for complete search history.

(56) References Cited

U.S. PATENT DOCUMENTS

| | | | | |
|---|---|---|---|---|
| 1,840,816 A * | 1/1932 | Kieper et al. | ................. | 101/3.1 |
| 5,910,282 A * | 6/1999 | Grozdanovski et al. | ........ | 623/27 |
| 6,349,639 B1 * | 2/2002 | Smith et al. | ..................... | 101/32 |
| 6,676,587 B2 * | 1/2004 | Smith et al. | ................... | 493/143 |
| 6,739,244 B1 * | 5/2004 | Carbaugh | ...................... | 101/3.1 |
| 7,469,634 B2 * | 12/2008 | Caron et al. | .................... | 101/26 |
| 7,717,035 B1 * | 5/2010 | Gray | ............................... | 101/23 |
| 2002/0197346 A1 * | 12/2002 | Papadopoulos | ............... | 425/194 |
| 2006/0191861 A1 * | 8/2006 | Mitterhofer et al. | .............. | 216/2 |
| 2009/0084278 A1 * | 4/2009 | Masi et al. | ...................... | 101/32 |

* cited by examiner

*Primary Examiner* — Geoffrey S Evans
(74) *Attorney, Agent, or Firm* — Hovey Williams LLP

(57) ABSTRACT

An embossing/debossing system and method for embossing or debossing an impressionable material, such as paper. The system may comprise a laser cutting apparatus and a stamping apparatus. The laser cutting apparatus may comprise a laser configured for cutting and/or ablating one or more patterns into a stencil material. The stamping apparatus may be configured to receive the stencil material from the laser cutting apparatus and may have an actuatable elastomeric press pad configured to press the impressionable material into the patterns formed in the stencil material by the laser cutting apparatus. The system may also comprise various feeding devices configured to feed the stencil material from the laser cutting apparatus to the stamping apparatus and/or configured to feed the impressionable material through the stamping apparatus.

14 Claims, 4 Drawing Sheets

SYSTEM AND METHOD FOR EMBOSSING/DEBOSSING IMPRESSIONABLE MATERIAL

RELATED APPLICATIONS

The present utility patent application claims priority benefit, with regard to all common subject matter, of earlier-filed U.S. provisional patent application titled "Emboss/Deboss Simplification" Ser. No. 61/394,225, filed Oct. 18, 2010, hereby incorporated in its entirety by reference into the present application.

BACKGROUND

1. Field

The present invention relates to systems and methods for embossing or debossing a deformable material.

2. Related Art

Embossing and debossing are processes of pressing paper or other deformable materials into relief using force and/or heat. In general, embossing creates a raised impression in the deformable material while debossing creates an indented impression in the deformable material. Embossing traditionally involves the use of two etched metal dies—a raised male die and a recessed female die. The raised male die forces the paper or other deformable material into the recessed female die to create the embossed impression. Many types of thin, flat, and/or malleable materials may be embossed or debossed, including paper, plastic film, metal foil, non-woven fabric, textile fabric, leather, and glass, if sufficiently heated.

Designing and manufacturing tools for embossing paper can be expensive and time consuming. The tools are usually made of metal alloy formed by CNC machining. The design and manufacture of the matching male/female tools can take several weeks. These male and female tools or dies are also prone to breakage, which then requires additional time to repair or replace. Furthermore, the quality of emboss using these tools is dependent on a trained operator for precise alignment of the tools with each other and with the paper, and for applying a proper amount of pressure and/or heat.

Therefore, there is a need for an embossing and debossing apparatus and method that overcome the deficiencies of the prior art.

SUMMARY

Embodiments of the present invention include an embossing/debossing system and method for embossing or debossing an impressionable material. The embossing/debossing system may comprise a laser cutting apparatus configured for cutting or ablating one or more patterns into a stencil material and a stamping apparatus configured to receive the stencil material from the laser cutting apparatus after the laser cutting apparatus cuts the one or more patterns therein. Furthermore, the stamping apparatus may be configured to press the impressionable material into the patterns formed in the stencil material.

In another embodiment of the invention, the embossing/debossing system may comprise a laser cutting apparatus, a stamping apparatus, and feeding devices. The laser cutting apparatus may comprise a laser configured for cutting or ablating one or more patterns into a stencil material. The stamping apparatus may be configured to receive the stencil material from the laser cutting apparatus and may have an actuatable elastomeric press pad configured to press an impressionable material into the patterns formed in the stencil material by the laser cutting apparatus. The feeding devices may be configured to feed the stencil material from the laser cutting apparatus to the stamping apparatus and/or configured to feed the impressionable material through the stamping apparatus.

Embodiments of the invention may also include a method for embossing and/or debossing impressionable material comprising the steps of actuating a laser cutting apparatus to cut or ablate one or more patterns into the stencil material, transferring the stencil material with the patterns cut or ablated therein to a stamping apparatus having a press pad, and pressing the impressionable material between the press pad and the stencil material. At least a portion of the impressionable material and at least a portion of the press pad may deform within the patterns cut or ablated into the stencil material during the pressing step.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

DESCRIPTION OF DRAWING FIGURES

Embodiments of the present invention are described in detail below with reference to the attached drawing figures, wherein.

Figure 1:
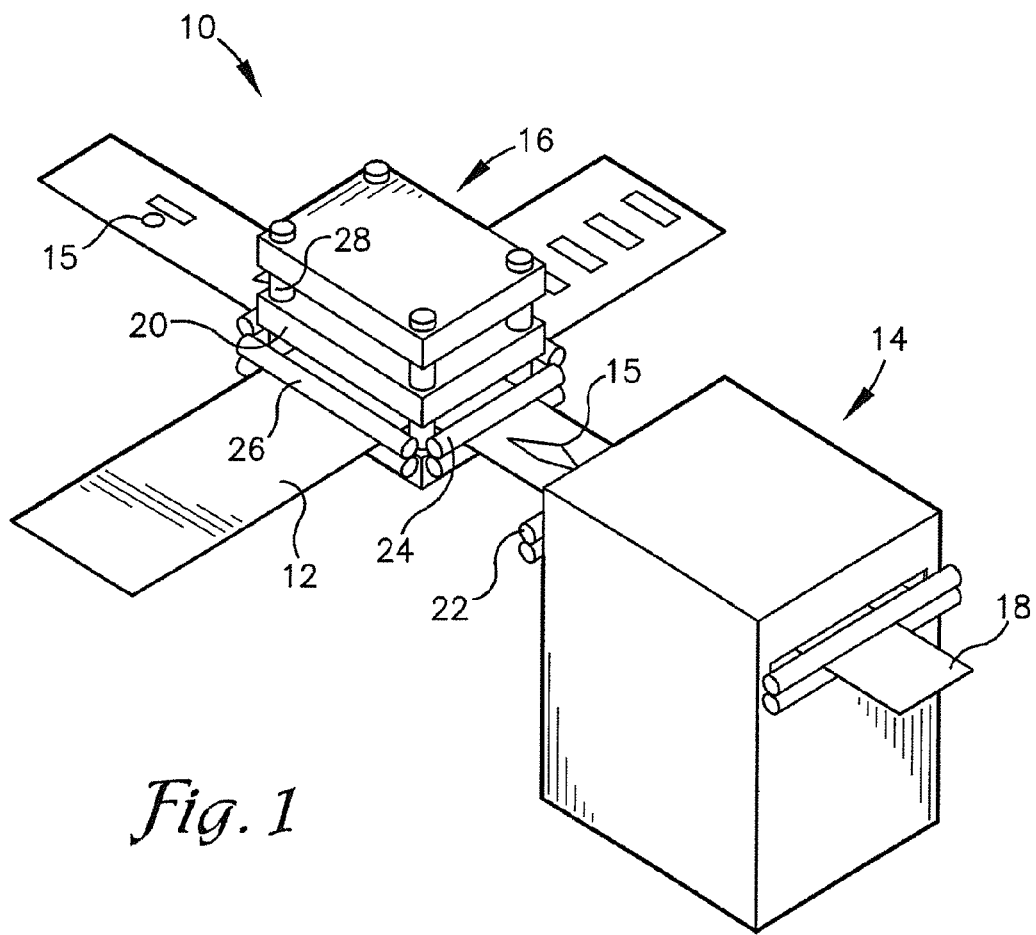
FIG. 1 is a schematic perspective view of an embossing/debossing system constructed in accordance with various embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An embossing/debossing system 10, constructed in accordance with various embodiments of the invention, is illustrated in FIG. 1. The system 10 is configured to emboss and/or deboss any type of deformable, thin, flat, and/or malleable or impressionable material 12, including paper, plastic film, metal foil, non-woven fabric, textile fabric, leather, and glass (if sufficiently heated).

Embodiments of the system 10 may comprise a laser cutting apparatus 14 configured to cut and/or ablate a stencil material 18 and a stamping apparatus 16 configured to emboss and/or deboss the impressionable material 12 using the cut and/or ablated stencil material 18. An embossed image, as defined herein, is a protrusion in the impressionable material 12 matching one or more patterns 15 cut and/or ablated into the stencil material 18. A debossed image, as defined herein, is a depression in the impressionable material 12 matching the patterns 15 cut and/or ablated into the stencil material 18.

The stencil material 18 may have any desired thickness and may be made of plastic, steel, polyethylene terephthalate (PET), or any other substantially rigid material capable of being cut and/or ablated by laser. In some embodiments of the invention, the stencil material 18 may be provided to the embossing/debossing system 10 as an elongated web of stencil material 18. Additionally or alternatively, individual pieces of the stencil material 18 may be provided to the laser cutting apparatus 14 for each individual pattern 15.

Figure 2:
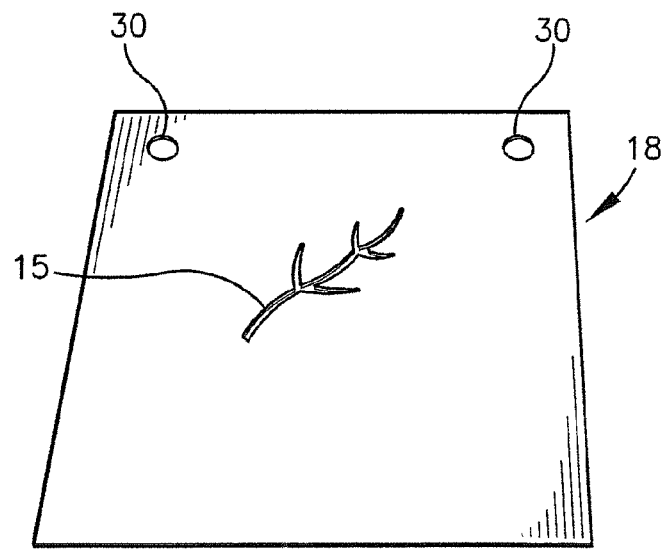
FIG. 2 is a top view of a piece of stencil material with a first pattern cut therethrough by the embossing/debossing system of FIG. 1.
Figure 3:
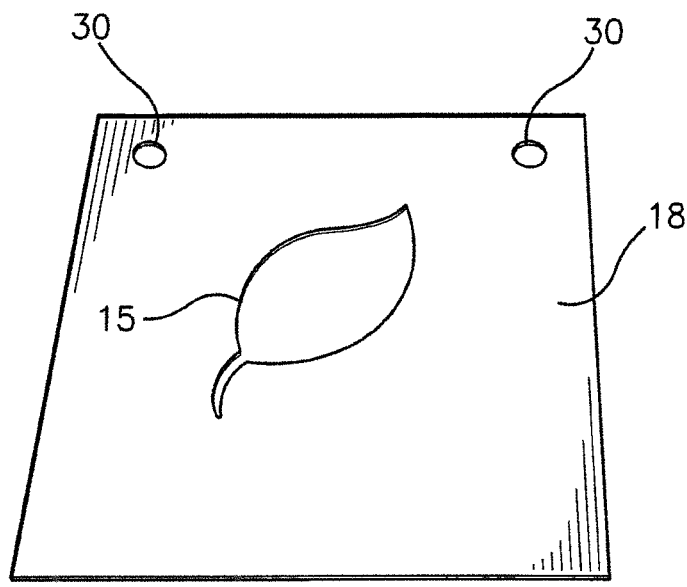
FIG. 3 is a top view of a piece of stencil material with a second pattern cut therethrough by the embossing/debossing system of FIG. 1.
Figure 4:
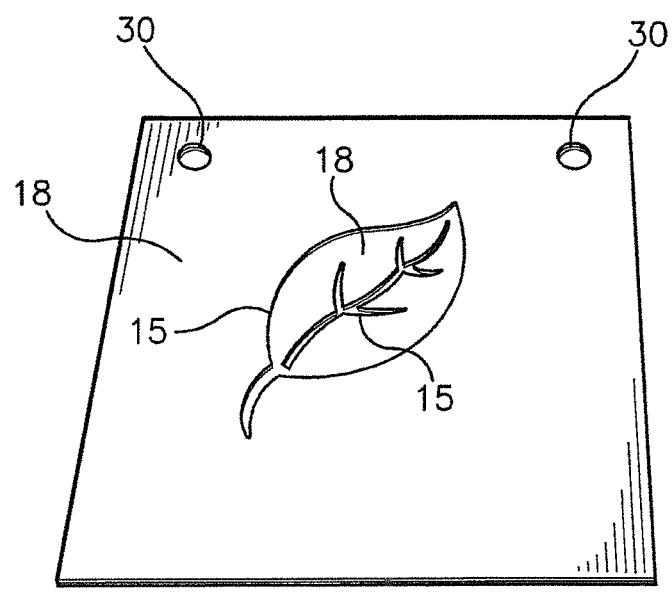
FIG. 4 is a top view of the pieces of stencil material stacked such that the first and second patterns overlapping each other to create a third pattern.
Figure 5:
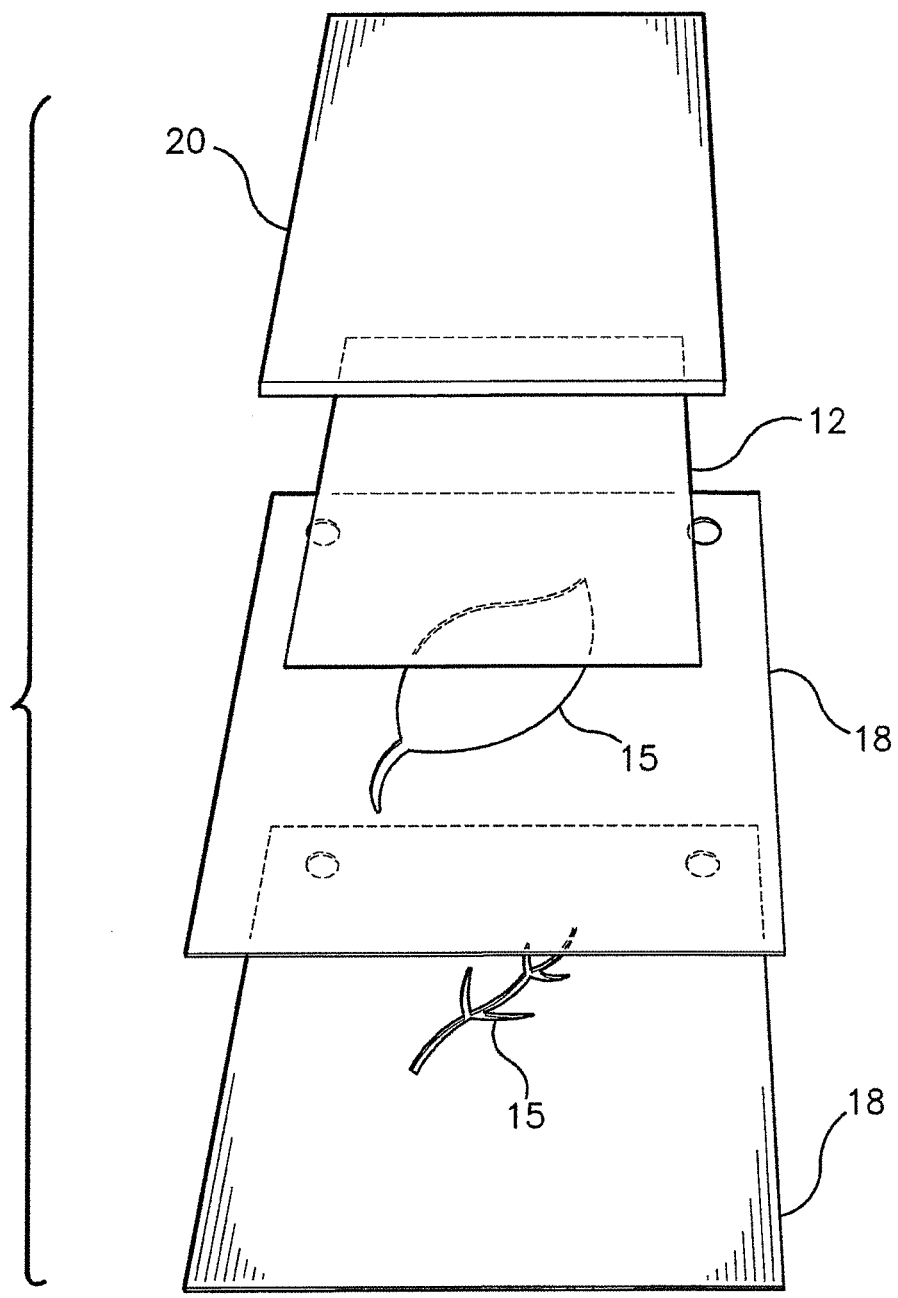
FIG. 5 is an exploded view of a press pad of the embossing/debossing system of FIG. 1, an impressionable material to be embossed or debossed, and the two stacked pieces of stencil material with the overlapping patterns.
Figure 6:
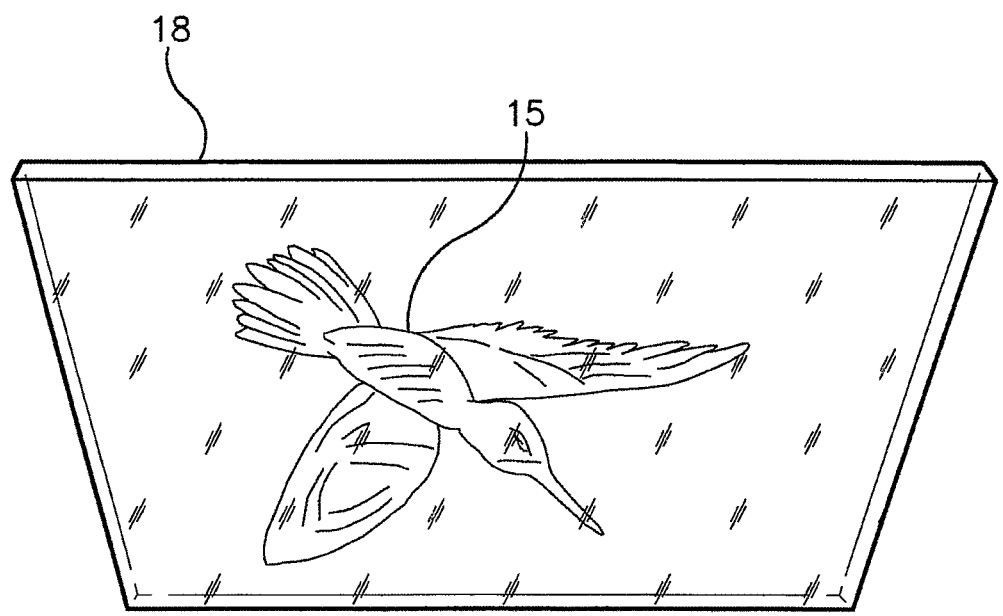
FIG. 6 is a perspective view of a piece of stencil material with a three-dimensional pattern etched or ablated therein.

The term "patterns," as used herein, may refer to designs or information regarding holes, openings or cavities to be formed through or into the stencil material 18. Additionally, the term "patterns" may also refer to the actual holes, openings, or cavities that are formed through or into the stencil material 18 by cutting out, ablating, or otherwise removing portions of material from the stencil material 18. For example, as illustrated in FIGS. 2 and 3, the patterns 15 may be holes of any shape, quantity, and dimension formed through the stencil material 18. In another embodiment of the invention, as illustrated in FIG. 6, the patterns 15 may be one or more cavities of any shape, quantity, and dimension formed into the stencil material 18. Furthermore, two or more cut stencil patterns 15 may be overlapped to create one three-dimensional pattern, as illustrated in FIGS. 4 and 5. The patterns 15 may include shapes, logos, text, brail, or any two- or three-dimensional design.

The laser cutting apparatus 14 may comprise any laser configured to cut, etch, and/or ablate the stencil material 18 to form the desired patterns 15. For example, the laser may be a $CO_2$ or fiber $CO_2$ laser, as known in the art. The laser cutting apparatus 14 may be operated by way of a skilled artisan or preferably by an automated control system (not shown). In some embodiments of the invention, the laser cutting apparatus 14 may also comprise one or more feeding devices 22 configured for feeding the web of stencil material 18 through the laser cutting apparatus 14. The feeding devices 22 may be one or more pairs of cooperatively-rotatable rollers or any other mechanical feeding devices known in the art, as later described herein.

The control system may be configured to receive the patterns 15 or data regarding the patterns 15 from a user and/or a pattern database and to automate the laser cutting, etching, or ablating of the selected patterns 15 through or into the stencil material 18. For example, a user may design a pattern using various computer software programs, scan a pattern with an image scanner, or draw a pattern on a graphics tablet to be uploaded into the control system. Then the control system may actuate the laser cutting apparatus 14 to cut and/or ablate the patterns 15 into the stencil material 18 according to the uploaded image. In some embodiments of the invention, the control system may also be configured to control actuation of various components of the stamping apparatus 16, as later described herein.

The control system may comprise any number or combination of controllers, circuits, integrated circuits, programmable logic devices such as programmable logic controllers (PLC) or motion programmable logic controllers (MPLC), computers, processors, microcontrollers, or other control devices and residential or external memory for storing data and other information accessed and/or generated by the embossing/debossing apparatus 10. The control system may be coupled with the actuation devices, the laser, and/or various sensors, such as registration or alignment sensors, to enable information to be exchanged between the various components of the embossing/debossing apparatus 10 and to position and actuate components of the embossing/debossing apparatus 10 for embossing or debossing the impressionable material 12. The control system may be configured to implement any combination of the algorithms, subroutines, or code corresponding to method steps described herein. However, in alternative embodiments of the invention, at least some of the method steps described herein may be performed manually via physical actuation by a user or operator of the embossing/debossing apparatus 10.

The control system and computer programs described herein are merely examples of computer equipment and programs that may be used to implement the present invention and may be replaced with or supplemented with other controllers and computer programs without departing from the scope of the present invention. The features of the control system may be implemented in a stand-alone device, which is then interfaced to the embossing/debossing apparatus 10 or components thereof. The control features of the present invention may also be distributed among the components of the embossing/debossing apparatus 10. Thus, while certain features are described as residing in the control system, the invention is not so limited, and those features may be implemented elsewhere.

The control system may implement a computer program and/or code segments to perform some of the functions and method described herein. The computer program may comprise an ordered listing of executable instructions for implementing logical functions in the control system. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The stamping apparatus 16 may comprise a press pad 20 configured for pressing the impressionable material 12 into the patterns 15 formed in the stencil material 18 and may also comprise one or more feeding devices 24,26. The stamping apparatus 16 may be communicably and/or physically coupled with the laser cutting apparatus 14 and/or may be physically aligned with the laser cutting apparatus 14, as illustrated in FIG. 1, such that the stencil material 18 may be cut and/or ablated by the laser cutting apparatus 14 and then fed into the stamping apparatus 16. However, in some alternative embodiments of the invention, the stamping apparatus 16 may be separate from the laser cutting apparatus 14 and the cut and/or ablated stencil material 18 may be moved from the laser cutting apparatus 14 to the stamping apparatus 16 manually by an operator. In some embodiments of the invention, the stamping apparatus 16 may be physically and/or communicably coupled with the control system described above for operating the laser cutting apparatus 14. In other embodiments of the invention, the stamping apparatus 16 may have its own control system (not shown) configured for automating actuation of the feeding devices 24,26 and/or the press pad 20, as later described herein.

The press pad 20 may be made of rubber, silicone, or any other deformable and/or elastomeric material and may have any shape, configuration, and durometer required for embossing or debossing the impressionable material 12 with the selected patterns 15. The press pad 20 may be actuatable to press the impressionable material 12 against the stencil material 18 and to press a portion of the impressionable material 12 into the patterns 15 formed in the stencil material 18. Specifically, because the impressionable material 12 and the press pad 20 are deformable, a portion of both the impressionable material 12 and the press pad 20 aligned with the patterns 15 may be pressed into or through the patterns 15 while another portion of the impressionable material 12 and the press pad 20 remain substantially parallel and/or flush with the stencil material 18 outward of the patterns 15.

The shape, configuration, and durometer chosen for the press pad 20 may depend on the particular deformable material 12 and/or stencil material 18 used. The press pad 20 may be attached to an actuation device 28 of the stamping apparatus 16 configured to raise and lower the press pad 20 toward and away from the patterns 15 cut and/or ablated into or through the stencil material 18. The quality and height or depth of the resulting pattern formed into the impressionable material 12 may depend on the pressure applied to the press pad 20, the durometer of the press pad 20, and/or the thickness of the stencil material 18. For three-dimensional patterns, the height or depth of the pattern on the impressionable material 12 may depend on the maximum depth of the pattern etched or ablated into the stencil material 18.

The feeding devices 24 may include one or more pairs of cooperatively-rotatable rollers or any other feeding devices known in the art and may be configured for feeding the impressionable material 12 through the stamping apparatus 16. Furthermore, in some embodiments of the invention, the feeding devices 26 may be configured for feeding the stencil material 18 from the laser cutting apparatus 14 to the stamping apparatus 16, as illustrated in FIG. 1. Actuation of the feeding devices 22,24,26 by the control system may depend on signals received from various alignment and registration sensors (not shown) or any other sensors known in the art for ensuring that the impressionable material 12 and/or the patterns 15 formed in the stencil material 18 are properly aligned according to a number of pre-defined parameters.

The feeding devices 22,24,26 and/or the actuation device 28 may be configured to actuate movement of the impressionable material 12, the stencil material 18, and/or the press pad 20 using any combination of pneumatic, electronic, mechanical, and/or electro-mechanical actuation components. For example, the actuation device 28 and/or the feeding devices 22,24,26 may include motors, gears, pistons, valves, cylinders, ball bearings, and/or any combination of actuation components known in the art.

In use, the stencil material 18 may be cut and/or ablated by the laser cutting apparatus 14 in any desired patterns 15, as illustrated in FIGS. 2-6, and then fed to or otherwise aligned with the stamping apparatus 16 to form an embossed or debossed image 17 in the impressionable material 12, as illustrated in FIG. 1. Specifically, the embossing/debossing system 10 may be used to perform a method of embossing and/or debossing that includes the steps of cutting and/or ablating the patterns 15 into the stencil material 18, transferring the stencil material 18 with the patterns 15 cut and/or ablated therein to the stamping apparatus 16, and pressing the impressionable material 12 between the press pad 20 and the stencil material 18, such that a portion of the impressionable material 12 and a portion of the press pad 20 are deformed into the patterns 15.

Cutting and/or ablating the stencil material 18 may include the step of the laser cutting apparatus 14 cutting, etching, or ablating the stencil material 18, thereby removing or vaporizing one or more portions of the stencil material 18 to form the pattern or patterns 15 therein. Furthermore, cutting and/or ablating the stencil material 18 may include the steps of receiving information corresponding to the patterns 15 to be cut and/or ablated into the stencil material 18 and then commanding actuation of the laser cutting apparatus 14 based on the received information. As noted above, the control system may receive information regarding the patterns 15 from a database or as input from a user.

The step of transferring the stencil material 18 may comprise actuating the feeding devices 22,26 of the laser cutting apparatus 14 and/or the stamping apparatus 16. Actuation of the feeding devices 22,26 may urge the stencil material 18 toward the stamping apparatus 16 until the pattern or patterns 15 are aligned with the press pad 20. Likewise, the feeding devices 24 may actuate the impressionable material 12 into proper registration or alignment within the press pad 20 to be embossed or debossed. Alternatively, the stencil material 18 may be transferred by an operator from the laser cutting apparatus 14 to the stamping apparatus 16.

The step of pressing the impressionable material 12 between the press pad 20 and the stencil material 18 may include actuating the press pad 20 toward and against the impressionable material 12 with enough force to press at least a portion of the impressionable material 12 into the pattern or patterns 15 of the stencil material 18. The amount of force to be applied by the press pad 20 may depend on the durometer of the press pad 20, the depth of the patterns 15, and the malleability of the impressionable material 12.

The method described above may be repeated a plurality of times for the same patterns or different patterns. Specifically, the feeding devices 24 may continue to feed the impressionable material 12 through the stamping apparatus 16 to emboss or deboss the selected pattern or patterns 15 as many times as desired. If a different pattern is selected by the user or control system, the feeding devices 22,26 may actuate the web of the stencil material 18 forward or backward to align a new pattern or a previous pattern with the press pad 20 before proceeding with embossing or debossing the impressionable material 12.

For multi-layered stencils, as illustrated in FIGS. 4 and 5, multiple pieces of the stencil material 18, along with their various patterns 15, may be stacked and aligned manually by a user or operator relative to the stamping apparatus 16. This can allow for embossing or debossing a pattern within a pattern or other more complex, multi-dimensional patterns into the impressionable material 12. In this embodiment of the invention, as illustrated in FIGS. 4 and 5, the pieces of the stencil material 18 must remain fixed relative to each other and the press pad 20 as the press pad 20 is actuated to press the impressionable material 12 into the stacked patterns 15. Various methods of securing these multiple pieces of stencil material 18 may be used, such as cutting alignment holes 30 into each of the pieces of the stencil material 18 through which a securing device may extend.

In another embodiment of the invention, complex, three-dimensional patterns may be embossed or debossed into the impressionable material 12 using a three-dimensional stencil, as illustrated in FIG. 6. The laser cutting apparatus 14 may ablate the stencil material 18, such as PET or other similar plastics, creating cavities of various depths to create one or more three-dimensional patterns. The stencil material 18 with the three-dimensional patterns 15 formed therein may then be properly aligned and secured within the stamping apparatus 16. Then the press pad 20 may be actuated to force the impressionable material 12 into the cavities of the three-dimensional patterns 15.

The use of laser cutting, etching, or ablating to create the stencil patterns 15 in combination with the use of the press pad 20 in place of a top die, as disclosed herein, is advantageous over other embossing and debossing methods, reducing the time to make a pattern tool down to seconds versus days using the prior art methods. Furthermore, the present invention avoids the use of complex, mating male and female dies, substantially reducing the cost of the tooling used for embossing or debossing. Yet another advantage of the present invention is that setup does not need to be performed by a highly trained operator, since registration alignment is automated and no precise alignment of any male and female dies is required.

Although the invention has been described with reference to the preferred embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An embossing/debossing system configured for embossing or debossing an impressionable material, the system comprising:
   a laser cutting apparatus configured for cutting or ablating one or more patterns into a stencil material;
   a stamping apparatus configured to receive the stencil material from the laser cutting apparatus after the laser cutting apparatus cuts or ablates the one or more patterns therein and configured to press the impressionable material into the patterns formed in the stencil material; and
   feeding devices configured to feed a web of the stencil material from the laser cutting apparatus and into the stamping apparatus.

2. The embossing/debossing system of claim 1, wherein the laser is configured to cut or ablate at least one of two-dimensional and three-dimensional patterns through or into the stencil material.

3. The embossing/debossing system of claim 1, wherein the stamping apparatus comprises a press pad actuatable toward and away from the stencil material and configured to press the impressionable material into the patterns formed in the stencil material.

4. The embossing/debossing system of claim 3, wherein the press pad is made of rubber, silicone, or any other elastomeric material.

5. The embossing/debossing system of claim 3, further comprising:
   impressionable material feeding devices configured to feed the impressionable material between the press pad and the stencil material; and
   a control system configured to automate actuation of the laser based on pattern designs uploaded from a database or received from another peripheral device and to command actuation of the stamping apparatus.

6. The embossing/debossing system of claim 1, wherein the laser cutting apparatus comprises a laser operable to cut into or ablate the stencil material.

7. The embossing/debossing system of claim 6, further comprising: a control system configured to automate actuation of the laser based on pattern designs uploaded from a database or received from another peripheral device.

8. The embossing/debossing system of claim 7, wherein the control system is configured to command actuation of the stamping apparatus.

9. An embossing/debossing system configured for embossing or debossing an impressionable material, the system comprising:
   a laser cutting apparatus having a laser configured for cutting or ablating one or more patterns into a stencil material;
   a stamping apparatus having a press pad and configured to receive the stencil material from the laser cutting apparatus after the laser cutting apparatus cuts the one or more patterns therein, wherein the press pad is actuatable toward and away from the stencil material and configured to press the impressionable material into the patterns formed in the stencil material; and
   stencil material feeding devices configured to feed the stencil material from the laser cutting apparatus to the stamping apparatus.

10. The embossing/debossing system of claim 9, wherein the laser is configured to cut or ablate at least one of two-dimensional and three-dimensional patterns through or into the stencil material.

11. The embossing/debossing system of claim 9, wherein the press pad is made of rubber, silicone, or any other elastomeric material.

12. The embossing/debossing system of claim 9, further comprising impressionable material feeding devices configured for feeding the impressionable material between the press pad and the stencil material.

13. The embossing/debossing system of claim 9, further comprising: a control system configured to automate actuation of the laser based on pattern designs uploaded from a database or received from another peripheral device.

14. The embossing/debossing system of claim 13, wherein the control system is configured to command actuation of the stamping apparatus and the feeding devices.

\* \* \* \* \*